(12) United States Patent
Laulainen

(10) Patent No.: US 8,139,481 B2
(45) Date of Patent: Mar. 20, 2012

(54) METHOD AND EQUIPMENT FOR SHAPING TRANSMISSION SPEED OF DATA TRAFFIC FLOW

(75) Inventor: Mikko Laulainen, Helsinki (FI)

(73) Assignee: Tellabs Oy, Espoo (FI)

( * ) Notice: Subject to any disclaimer, the term of this patent is extended or adjusted under 35 U.S.C. 154(b) by 257 days.

(21) Appl. No.: 12/427,938

(22) Filed: Apr. 22, 2009

(65) Prior Publication Data

US 2009/0262645 A1 Oct. 22, 2009

(30) Foreign Application Priority Data

Apr. 22, 2008 (FI) ...................................... 20085338

(51) Int. Cl.
*H04J 1/16* (2006.01)
(52) U.S. Cl. ........................................................ 370/229
(58) Field of Classification Search ........ 370/229–235.1
See application file for complete search history.

(56) References Cited

U.S. PATENT DOCUMENTS

| | | | |
|---|---|---|---|
| 5,978,356 A * | 11/1999 | Elwalid et al. ................ | 370/230 |
| 6,519,595 B1 | 2/2003 | Rose | |
| 6,549,514 B1 | 4/2003 | Kilkki et al. | |
| 7,830,796 B2 * | 11/2010 | Chen et al. ................. | 370/230.1 |
| 2003/0174650 A1 * | 9/2003 | Shankar et al. ............. | 370/235 |
| 2004/0264486 A1 * | 12/2004 | Sankey et al. .............. | 370/412 |
| 2007/0002741 A1 * | 1/2007 | Vaananen et al. ............ | 370/235 |
| 2008/0112318 A1 * | 5/2008 | Groleau et al. ............ | 370/230.1 |
| 2008/0298245 A1 * | 12/2008 | Onbeck ..................... | 370/235.1 |

FOREIGN PATENT DOCUMENTS

| | | |
|---|---|---|
| EP | 0 817 436 | 1/1998 |
| EP | 0 873 037 | 10/1998 |
| EP | 1 075 116 A2 | 2/2001 |
| EP | 1 124 356 | 8/2001 |
| EP | 1 694 004 A1 | 8/2006 |
| WO | 2005/039123 | 4/2005 |
| WO | WO 2007/076879 A1 | 7/2007 |

OTHER PUBLICATIONS

Extended European Search Report dated Aug. 13, 2009.
M. Hout et al., "Investigation of premium service using differentiated services IP", Computer Communication, vol. 22, Sep. 15, 1999, pp. 1283-1295.
Finnish Search Report dated Jan. 20, 2009, from corresponding Finnish application.

* cited by examiner

*Primary Examiner* — Kwang B Yao
*Assistant Examiner* — Juvena Loo
(74) *Attorney, Agent, or Firm* — Young & Thompson

(57) ABSTRACT

A method and apparatus for monitoring and limiting the transmission speed of a data traffic flow in a situation where the traffic flow also includes delay-critical traffic. With the sending of each protocol data unit it is determined whether the sending of the next protocol data unit should be delayed in order to meet a condition set on the transmission speed. It is also determined whether the transfer speed of delay-critical traffic meets a preset condition. If the transfer speed meets the condition, delay-critical protocol data units will not be delayed but if the condition is not met, delay-critical protocol data units will be delayed just like non-delay-critical protocol data units. Thus the transfer speed of non-delay-critical traffic adapts to variations in the transfer speed of delay-critical traffic and, furthermore, the transmission speed of the traffic flow can be monitored and limited.

33 Claims, 5 Drawing Sheets

METHOD AND EQUIPMENT FOR SHAPING TRANSMISSION SPEED OF DATA TRAFFIC FLOW

FIELD

Embodiments of the invention relates to shaping the transmission speed of a data traffic flow. Some embodiments of the invention are directed to a method and equipment for shaping the transmission speed of a data traffic flow. Some embodiments of the invention are also directed to a network element and a computer program.

BACKGROUND

In many communications applications it is advantageous and sometimes even necessary that protocol data units are defined to belong to different traffic categories such as Classes of Service (CoS) based on the requirements of the applications using the communications service and, on the other hand, on the Service Level Agreements (SLA), for example, between the service provider and the customers. Such protocol data units may be e.g. IP (Internet Protocol) packets, ATM (Asynchronous Transfer Mode) cells, Ethernet units, Frame Relay units, or MPLS (Multiprotocol Label Switching) units. For example, in a VoIP (Voice over Internet Protocol) telephony application it is important that the data transfer delay and delay variation remain below permitted limit values. Such permissible limit values can be defined in a service quality agreement, for instance. However, when downloading a web page, for example, the transfer delay and its variation are significantly less critical quantities.

It is often desirable to monitor and/or limit the speed properties of a traffic flow comprised of protocol data units to be transferred. A speed property may refer to the Committed Information Rate (CIR), Committed Burst Size (CBS) by which the CIR can be momentarily exceeded, or the Peak Information Rate (PIR), for example. A traffic flow may include protocol data units representing different traffic categories such as different classes of service, for example. Such a situation occurs, for example, if it is desired to reserve to a certain customer a specific portion of the data transfer capacity [bit/s] of a data transfer link so that the customer's traffic will not be permitted to exceed the transfer capacity reserved to that customer. The various protocol data units of the traffic flow representing the traffic of that particular customer may belong to different traffic categories such as classes of service, for instance. Part of the customer's traffic may be delay-critical transfer of voice or video signal, for instance, and part of it may be non-delay-critical file transfer, for instance. Monitoring and/or limiting of the speed properties of a traffic flow should not increase the transfer delay nor the variation of the delay of delay-critical traffic.

The speed properties of a traffic flow typically are monitored and/or limited at a network element of a communications network, which network element is adapted to receive, buffer and forward protocol data units. The network element may be e.g. an IP (Internet Protocol) router, Ethernet switch, ATM (Asynchronous Transfer Mode) switch, base station of a mobile communications network, an MPLS (Multi Protocol Label Switching) switch, or a combination of these. The speed properties typically are monitored and/or limited by monitoring the arrival speeds of traffic flows arriving at the network element and/or by monitoring and/or shaping the transmission speeds of traffic flows departing from the network element. The operation in which the speed properties of a traffic flow are altered is referred to as 'shaping', and the equipment that does the shaping is referred to as a 'shaper'.

Publication US2007/0002741 discloses a method and equipment for shaping the transmission speed of a traffic flow when the traffic flow also contains delay-critical data traffic. In connection with the sending of each protocol data unit it is determined whether the sending of the protocol data unit to be sent next has to be delayed in order to meet a condition set on the transmission speed. Thus the need for delay is determined regardless of whether the protocol data unit which is to be sent (or was sent) is representative of delay-critical or non-delay-critical traffic. The sending of the protocol data unit to be sent next is delayed only if there is a need for delay and if the protocol data unit to be sent next is representative of non-delay-critical traffic. So, the sending of protocol data units representing delay-critical traffic will not be delayed even if there were a specified need for delay. This way the transfer speed of non-delay-critical traffic will adapt to variations of transfer speed of delay-critical traffic and, on the other hand, the shaping of the transmission speed will not increase the transfer delay nor variation of the delay of delay-critical traffic. Transmission speed of a traffic flow can be limited according to desired speed and/or burst limitations if the portion of delay-critical traffic in the traffic flow is so small that the delay-critical traffic alone will not exceed the speed and/or burst limitations. If the delay-critical traffic exceeds the speed and/or burst limitations the transmission speed of a traffic flow cannot be limited according to the speed and/or burst limitations because the sending of protocol data units representing delay-critical traffic shall not be delayed even if there were a specified need for delay. Delaying the sending of protocol data units representative of delay-critical traffic would increase the transfer delay and variation of delay of delay-critical traffic.

SUMMARY

Embodiments of the present invention are directed to a novel equipment for shaping the transmission speed of a data traffic flow in which each protocol data unit is arranged to belong to one of at least two traffic categories. The equipment includes a control equipment arranged to:

a) determine, in response to the sending of a protocol data unit, whether the sending of the next protocol data unit should be delayed in order to meet a condition set on the transmission speed, b) delay the sending of the next protocol data unit in response to a situation in which the next protocol data unit belongs to a first traffic category and the sending of the next protocol data unit should be delayed in order to meet a condition set on the transmission speed, c) determine whether the transfer speed of protocol data units belonging to a second traffic category and constituting part of the traffic flow meets a preset condition, d) in response to a situation in which the next protocol data unit belongs to the second traffic category and the transfer speed meets the preset condition, allow the sending of the next protocol data unit even if the sending of the next protocol data unit should be delayed in order to meet the condition set on the transmission speed, e) delay the sending of the next protocol data unit in response to a situation in which the next protocol data unit belongs to the second traffic category and the sending of the next protocol data unit should be delayed in order to meet a condition set on the transmission speed and the transfer speed does not meet the preset condition, and f) allow the sending of said next protocol data unit in response to a situation in which (i) there is no need to delay the sending of said next protocol data unit in order to meet the condition set on the transmission speed and (ii) said transfer speed does not meet the preset condition, and also in response to a situation in which (i) there is no need to delay the sending of said next protocol data unit in order to meet the condition set on the transmission speed and (ii) said transfer speed meets the preset condition.

The transfer speed of protocol data units belonging to the second traffic category may be the speed of arrival of traffic which represents the second traffic category and constitutes part of the traffic flow, or the transmission speed of the traffic. Momentary speed of arrival may differ from the momentary transmission speed as traffic typically is buffered between reception and transmission. In addition, speed of arrival and transmission speed will differ if protocol data units are discarded after reception.

Protocol data units belonging to the first traffic category can represent non-delay-critical traffic and protocol data units belonging to the second traffic category can represent delay-critical traffic, for example. The sending of protocol data units representing delay-critical traffic is delayed when the transfer speed of delay-critical traffic does not meet the preset condition. The transmission speed of a traffic flow can thus be limited according to desired speed and/or burst limitations even if the portion of delay-critical traffic exceeded the speed and/or burst limitations. However, the transfer delay and/or variation of delay of delay-critical traffic is not unnecessarily increased as the sending of protocol data units representing delay-critical traffic is allowed regardless of a specified need for delay if the transfer speed of delay-critical traffic meets the preset condition. The condition set on the transmission speed of a traffic flow and the condition set on the transfer speed of delay-critical traffic may be conditions defined in the Service Level Agreement (SLA) between a service provider and service user.

The invention is also directed to a novel network element adapted to receive, buffer and send protocol data units. The network element includes an equipment according to the invention for shaping the transmission speed of a data traffic flow in which each protocol data unit is arranged to belong to one of at least two traffic categories.

Embodiments of the invention are also directed to a novel method for shaping the transmission speed of a data traffic flow in which each protocol data unit is arranged to belong to one of at least two traffic categories. In the method:

a) it is determined, in response to the sending of a protocol data unit, whether the sending of the next protocol data unit should be delayed in order to meet a condition set on the transmission speed, b) the sending of the next protocol data unit is delayed in response to a situation in which the next protocol data unit belongs to a first traffic category and the sending of the next protocol data unit should be delayed in order to meet a condition set on the transmission speed, c) it is determined whether the transfer speed of protocol data units belonging to a second traffic category and constituting part of the traffic flow meets a preset condition, d) the sending of the next protocol data unit is allowed in response to a situation in which the next protocol data unit belongs to the second traffic category and the transfer speed meets the preset condition, even if the sending of the next protocol data unit should be delayed in order to meet the condition set on the transmission speed, e) the sending of the next protocol data unit is delayed in response to a situation in which the next protocol data unit belongs to the second traffic category and the sending of the next protocol data unit should be delayed in order to meet a condition set on the transmission speed and the transfer speed does not meet the preset condition, and f) the sending of said next protocol data unit is allowed in response to a situation in which (i) there is no need to delay the sending of said next protocol data unit in order to meet the condition set on the transmission speed and (ii) said transfer speed does not meet the preset condition, and also in response to a situation in which (i) there is no need to delay the sending of said next protocol data unit in order to meet the condition set on the transmission speed and (ii) said transfer speed meets the preset condition.

Embodiments of the invention are also directed to a novel computer program for controlling a programmable processor to shape the transmission speed of a data traffic flow in which each protocol data unit is arranged to belong to one of at least two traffic categories. The computer program includes instructions executable by a programmable processor for making the programmable processor:

a) determine, in response to the sending of a protocol data unit, whether the sending of the next protocol data unit should be delayed in order to meet a condition set on the transmission speed, b) delay the sending of the next protocol data unit in response to a situation in which the next protocol data unit belongs to a first traffic category and the sending of the next protocol data unit should be delayed in order to meet a condition set on the transmission speed, c) determine whether the transfer speed of protocol data units belonging to a second traffic category and constituting part of the traffic flow meets a preset condition, d) allow the sending of the next protocol data unit in response to a situation in which the next protocol data unit belongs to the second traffic category and the transfer speed meets the preset condition, even if the sending of the next protocol data unit should be delayed in order to meet the condition set on the transmission speed, e) delay the sending of the next protocol data unit in response to a situation in which the next protocol data unit belongs to the second traffic category and the sending of the next protocol data unit should be delayed in order to meet a condition set on the transmission speed and the transfer speed does not meet the preset condition, and f) allow the sending of said next protocol data unit in response to a situation in which (i) there is no need to delay the sending of said next protocol data unit in order to meet the condition set on the transmission speed and (ii) said transfer speed does not meet the preset condition, and also in response to a situation in which (i) there is no need to delay the sending of said next protocol data unit in order to meet the condition set on the transmission speed and (ii) said transfer speed meets the preset condition.

The various embodiments of the invention are characterised by that which is specified in the dependent claims.

BRIEF DESCRIPTION OF DRAWINGS

Embodiments of the invention and their advantages will now be described in closer detail with reference to the embodiments presented as examples and to the accompanying Figures where.

DESCRIPTION OF EMBODIMENTS OF THE INVENTION

Figure 1:
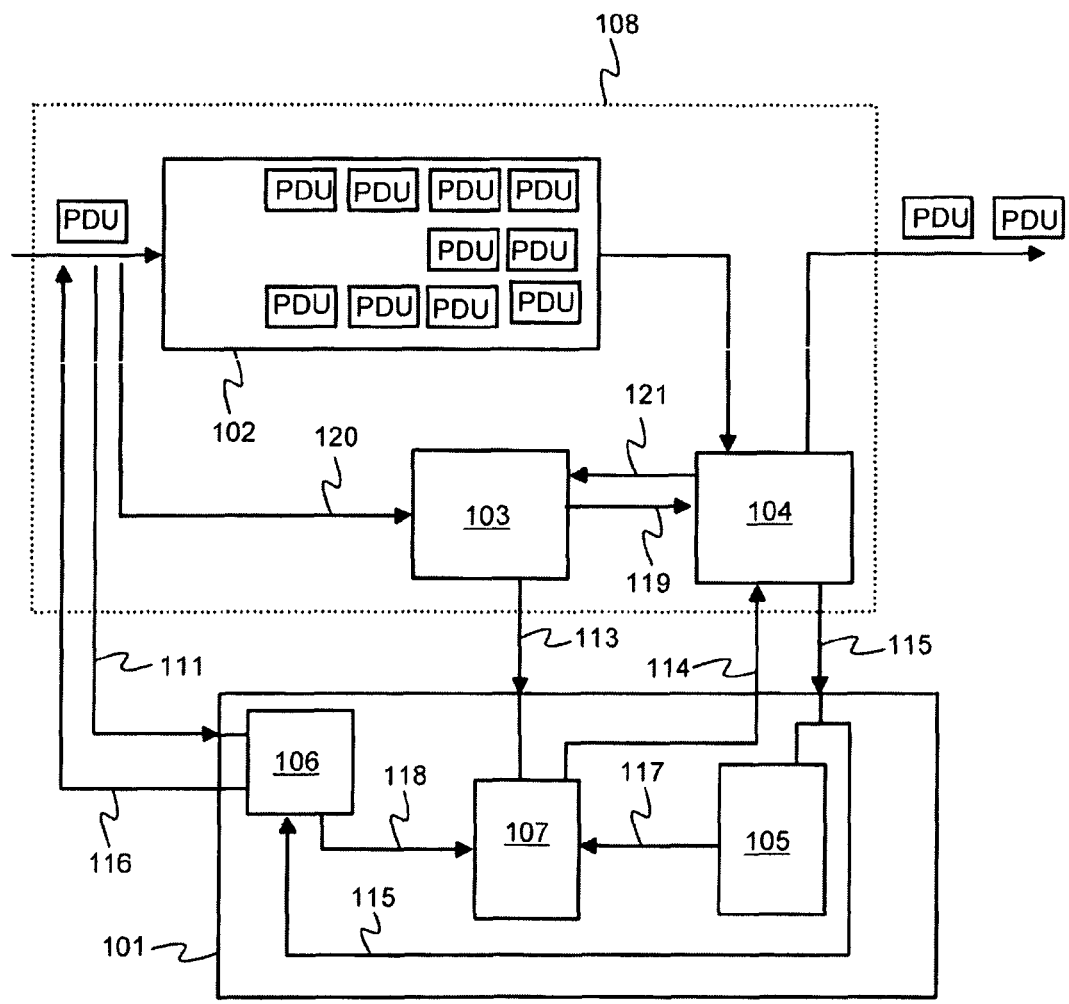
FIG. 1 shows, in a block diagram, an equipment according to an embodiment of the invention for shaping the transmission speed of a data traffic flow.

FIG. 1 shows, in a block diagram, an equipment 101 according to an embodiment of the invention for shaping the transmission speed of a data traffic flow. Each protocol data unit (PDU) is arranged to belong to one of at least two traffic categories. The traffic categories may be Classes of Service (CoS), for instance. The protocol data units may be, for example, IP (Internet Protocol) packets, ATM (Asynchronous Transfer Mode) cells, Ethernet units, MPLS (Multiprotocol Label Switching) units, and/or Frame Relay units. The equipment 101 is connected with a system 108 which is arranged to receive, buffer, and send protocol data units. For illustrative purposes, the operation of the system 108 is briefly described before describing the equipment 101 according to an embodiment of the invention.

Protocol data units can be received from one or more data transfer links (not shown in FIG. 1) connected with the system 108. Similarly, protocol data units can be sent to one or more data transfer links (not shown in FIG. 1). The system 108 includes a buffer memory 102, scheduler 103, and a send unit 104. The buffer memory 102 is adapted to buffer protocol data units arriving in the system 108. The scheduler 103 is adapted to choose, among protocol data units in the buffer memory 102, a protocol data unit to be sent, in accordance with a predetermined scheduling algorithm. The scheduler 103 is arranged to deliver to the send unit 104 a piece of information 119 indicating the protocol data unit chosen by the scheduler. The send unit 104 is arranged to read the chosen protocol data unit from the buffer memory 102 and to send the chosen protocol data unit. The send unit 104 is arranged to deliver to the scheduler 103, following the sending of the protocol data unit, a choose request 121 requesting the scheduler to choose the protocol data unit to be sent next. The scheduler 103 or another functional unit in connection therewith is arranged to maintain and update a data structure which indicates the order of arrival of protocol data units in the buffer memory as well as other necessary information regarding the protocol data units. The data structure is maintained and updated in conjunction with the reception of each protocol data unit on the basis of the information 120 delivered to the scheduler 103 (or another functional unit in connection therewith). The information 120 includes the necessary information regarding the arriving protocol data unit such as the size [bit] and traffic category of the protocol data unit.

Protocol data units in the buffer memory may be organised in parallel FIFO (First In First Out) queues, each FIFO queue representing a certain traffic category such as Class of Service, for instance, or a certain portion of traffic representing a certain traffic category, such as the portion of a customer or such of traffic representing a certain Class of Service, for example. The scheduler 103 may be arranged to choose the next protocol data unit on a priority basis, for example, so that protocol data units belonging to a certain traffic category have priority over protocol data units belonging to some other traffic category or categories, and/or on a weight coefficient basis so that the transfer capacity [bit/s] is divided using predetermined ratios between the different traffic categories. An example of a weight coefficient based scheduling algorithm is presented in publication Pawan Goyal, Harric M. Vin, Haichen Cheng, Start-time fair Queuing: A scheduling Algorithm for Integrated Services Packet Switching Networks, Teachnical Report TR-96-02, Department of Computer Sciences, University of Texas Austin.

The equipment 101 includes functional parts 105, 106, and 107 implemented by software and/or hardware, which parts constitute a control equipment for shaping the transmission speed of a traffic flow. Each protocol data unit in the traffic flow is arranged to belong to one of at least two traffic categories. Below it is assumed that protocol data units the delaying of which can be allowed (non-delay-critical traffic) belong to a first traffic category A and protocol data units the unnecessary delaying of which should be avoided (delay-critical traffic) belong to a second traffic category B. Both traffic categories A and B may comprise one or more classes of service, for example.

Functional part 105 is arranged to determine, based on a predetermined rule, in response to the sending of a protocol data unit, whether the sending of the next protocol data unit should be delayed in order to meet a condition set on the transmission speed of the traffic flow. The protocol data unit sent may belong to either one of the traffic categories A and B. In other words, the need for delay is determined regardless of which traffic category, A or B, the protocol data unit belongs to. The send moment of the protocol data unit can be defined to be the starting moment or the ending moment of transmission, for example. If the send moment is the starting moment of transmission, the phrase 'protocol data unit sent' covers also a protocol data unit which is being sent at the moment. Functional part 105 is arranged to deliver to functional part 107 a piece of information 117 indicating the need for delay and advantageously also the end moment of the potential delay. Functional part 105 is arranged to receive from the system 108 a piece of information 115 on the basis of which it can be determined whether the sending of the next protocol data unit should be delayed in order to meet a condition set on the transmission speed of the traffic flow. The determining can be done in many different ways, so the piece of information 115 may contain different information in different embodiments of the invention. Ways of doing the determining are given as examples later in this document.

Functional part 106 is arranged to determine whether the transfer speed [bit/s] of protocol data units belonging to traffic category B (delay-critical) and constituting part of the traffic flow meets a preset condition; i.e. whether the transfer speed of data traffic representative of traffic category B and constituting part of the traffic flow meets the preset condition. Functional part 106 is arranged to deliver to functional part 107 a piece of information 118 indicating whether the transfer speed meets the preset condition. The transfer speed may be either the speed of arrival at buffer memory 102 of traffic representing traffic category B or the transmission speed from buffer memory 102 of traffic representing traffic category B.

In an equipment 101 according to an embodiment of the invention the functional part 106 is arranged to determine whether the speed of arrival at buffer memory 102 of traffic representing traffic category B meets the preset condition and to set a piece of information 118 to indicate whether the speed of arrival meets the preset condition. Functional part 106 is arranged to receive from the system 108 a piece of information 111 on the basis of which it can be determined whether the speed of arrival meets the preset condition. The determining can be done in many different ways, so the piece of information 111 may contain different information in different embodiments of the invention. Ways of doing the determining are given as examples later in this document.

In an equipment 101 according to another embodiment of the invention the functional part 106 is arranged to determine whether the transmission speed from buffer memory 102 of traffic representing traffic category B meets the preset condition and to set a piece of information 118 to indicate whether the transmission speed meets the preset condition. Functional part 106 is arranged to receive from the system 108 a piece of information 115 on the basis of which it can be determined whether the transmission speed meets the preset condition. The determining can be done in many different ways, so the piece of information 115 contains different information in different embodiments of the invention. Ways of doing the determining are given as examples later in this document.

Functional part 107 is arranged to receive from the system 108 a piece of information 113 indicating the traffic category of the next protocol data unit. The scheduler 103 has chosen the next protocol data unit in response to a choose request 121. Functional part 107 is arranged to delay the sending of the next protocol data unit in the following cases 1) and 2):
1) the next protocol data unit belongs to traffic category A (non-delay-critical) and the sending of the next protocol data unit should be delayed in order to meet a condition set on the transmission speed of the traffic flow, and
2) the next protocol data unit belongs to traffic category B (delay-critical) and the sending of the next protocol data unit should be delayed in order to meet a condition set on the transmission speed of the traffic flow and the transfer speed of traffic representing traffic category B does not meet a preset condition.

Functional part 107 is arranged to allow the sending of the next protocol data unit without delay in case 3) mentioned below, even if the sending of the next protocol data unit should be delayed in order to meet a condition set on the transmission speed of the traffic flow:
3) the next protocol data unit belongs to traffic category B (delay-critical) and the transfer speed of traffic representing traffic category B meets the preset condition.

In other words, if the transfer speed of traffic representing traffic category B does not meet the preset condition, protocol data units belonging to traffic category B (delay-critical) will be delayed like protocol data units belonging to traffic category A (non-delay-critical). If the transfer speed of traffic representing traffic category B meets the preset condition, i.e. traffic which is representative of traffic category B meets the limitations set upon it, protocol data units belonging to traffic category B will not be delayed. Thus the transmission speed of traffic representing traffic category A will adapt to variations in the transmission speed of traffic representing traffic category B and, furthermore, shaping of the transmission speed of the traffic flow will not increase the transfer delay nor variation of delay of traffic representing traffic category B if the traffic that represents traffic category B complies with the limitations set on it.

Functional part 107 is arranged to deliver to the system 108 a piece of information 114 indicating whether the sending of the next protocol data unit shall be delayed and advantageously also the end moment of the potential delay. If the piece of information 114 does not indicate the end moment of the potential delay the system 108 is able to detect the end of delay on the basis of a change in the piece of information 114. The piece of information 114 can be produced by logic operations, for example, based on pieces of information 113, 117, and 118. For example, let us assume that
information 113='1' if the next protocol data unit belongs to traffic category A,
information 113='0' if the next protocol data unit belongs to traffic category B,
information 114='1' indicates that sending of the next protocol data unit is not allowed,
information 114='0' indicates that sending of the next protocol data unit is allowed,
information 117='1' if there is a need for delay,
information 117='0' if there is no need for delay,
information 118='1' if the transfer speed of traffic representing traffic category B does not meet the condition set on it, and
information 118='0' if the transfer speed of traffic representing traffic category B meets the condition set on it.
Information 114 can be produced using logic AND and OR operations as follows:
Information 114=information 117 AND (information 113 OR information 118).

The next protocol data unit may change during the delay, because during the delay the buffer memory 102 may receive a protocol data unit which according to the scheduling algorithm has a better right to become chosen than the protocol data unit which had been chosen as the next protocol data unit in the situation that prevailed at the beginning of delaying. Thus the piece of information 113 which indicates the traffic category of the next protocol data unit may change during the delaying. Therefore it is possible that during the delaying the piece of information 114 comes to indicate that the sending of the next protocol data unit will not be delayed, whereby the delaying will not be continued even if there were delaying time still left.

It is also possible that the transfer speed of traffic representing traffic category B does not meet the preset condition in the situation prevailing at the beginning of the delaying, but during the delaying the condition is met. Let us assume that the transfer speed is represented by the speed of arrival of traffic representing traffic category B. The condition on the speed of arrival is met during the delaying e.g. when no protocol data units belonging to traffic category B arrive during the delaying and the speed of arrival remains below the maximum permitted value specified for the speed of arrival during the delaying. The speed of arrival decreases with time because the cumulative amount of incoming data representing traffic category B does not increase if no protocol data units belonging to traffic category B are arriving but time progresses. Therefore it is possible that during delaying the piece of information 118 changes to indicate that the traffic representing traffic category B meets the condition set on it. This may result in that during delaying the piece of information 114 changes to indicate that the sending of the next protocol data unit will not be delayed, whereby the delaying will not be continued even if there were delaying time still left.

In an equipment 101 according to an embodiment of the invention functional part 106 is arranged to determine whether the speed of arrival of traffic representing traffic category B (delay-critical) meets a second preset condition and to discard one or more protocol data units belonging to traffic category B in response to a situation where the speed of arrival does not meet the second preset condition. In other words, if the speed of arrival of traffic representing traffic category B does not meet the second preset condition, the amount of traffic representing traffic category B is restricted by discarding protocol data units belonging to traffic category B. Functional part 106 is advantageously arranged to discard the last-arrived protocol data unit belonging to traffic category B in response to a situation where the speed of arrival does not meet the second preset condition. Thus the capacity of the buffer memory 102 will not be used for the storage of protocol data units which will not be transmitted. Functional part 106 is arranged to deliver to the system 108 a piece of information 116 which instructs a protocol data unit to be discarded. Whether or not the preset condition concerning the delaying of protocol data units belonging to traffic category B is met can be determined based on either the transmission speed of traffic representing traffic category B or the speed of arrival of traffic representing traffic category B.

In an equipment 101 according to an embodiment of the invention functional part 106 is arranged to determine whether the speed of arrival of traffic representing traffic category B meets a second preset condition and to attach a predetermined marking to one or more protocol data units belonging to traffic category B in response to a situation where the speed of arrival does not meet the second preset condition. Functional part 106 is advantageously arranged to attach the predetermined marking to the last-arrived protocol data unit belonging to traffic category B in response to a situation where the speed of arrival does not meet the second preset condition. Functional part 106 is arranged to deliver to the system 108 a piece of information 116 concerning the attachment of a predetermined marking to a protocol data unit. The predetermined marking informs network elements, such as routers for example, further on the transfer path of the protocol data units about the fact that the speed of arrival of traffic representing traffic category B does not meet the second preset condition. This way, a network element located further on the path knows to take measures in order to restrict traffic representing traffic category B similarly as when using the ECN protocol (Explicit Congestion Notification), for instance. Whether or not the preset condition concerning the delaying of protocol data units belonging to traffic category B is met can be determined based on either the transmission speed of traffic representing traffic category B or the speed of arrival of traffic representing traffic category B.

Below there are described, as examples, some ways of determining whether the sending of the next protocol data unit should be delayed in order to meet the condition set on the transmission speed of the traffic flow. It must be noted, however, that in an equipment 101 according to embodiments of the invention that determining can also be done in numerous ways other than those according to the examples depicted below.

In an equipment 101 according to an embodiment of the invention functional part 105 is arranged to receive from the system 108 a piece of information 115 indicating the size PKS [bit] of the protocol data unit sent and the transmitting moment $T\_tx$ of the starting point (bit to be sent first) of the protocol data unit in question (start time of transmission). The information 115 is advantageously received already during the sending of the protocol data unit. The functional part 105 is arranged to determine, based on equation $$T\_next = T\_tx + PKS/S\_tx \quad (1)$$

whether the sending of the next protocol data unit should be delayed in order to meet the condition set on the transmission speed of the traffic flow. $S\_tx$ is the maximum permissible transmission speed [bit/s] of the traffic flow and $T\_next$ is the earliest moment of time at which the next protocol data unit can be sent without exceeding the maximum permissible transmission speed. If $T\_next$ is greater than current time t ($T\_next > t$) the sending of the next protocol data unit should be delayed in order to meet the condition set on the transmission speed until $t = T\_next$. The information 117 can be set e.g. as follows: information 117='1' if current time $t < T\_next$, and '0' if $t \geq T\_next$.

In an equipment 101 according to an embodiment of the invention functional part 105 is arranged to receive from the system 108 a piece of information 115 indicating the size PKS_next [bit] of the next protocol data unit and the transmitting moment $T\_last\_tx$ of the end point (bit to be sent last) of the protocol data unit transmitted (end time of transmission). The functional part 105 is arranged to determine, based on equation $$T\_next = T\_last\_tx + PKS\_next/S\_tx - PKS\_next/C\_tx \quad (2)$$

whether the sending of the next protocol data unit should be delayed in order to meet the condition set on the transmission speed of the traffic flow. $C\_tx$ is the transmission capacity [bit/s] which may be the capacity of the data transfer link out of the network element, for example. If $T\_next$ is greater than current time, the sending of the next protocol data unit should be delayed in order to meet the condition set on the transmission speed. The information 117 can be set e.g. as follows: information 117='1' if current time $t < T\_next$, and '0' if $t \geq T\_next$. Equation (1) has the advantage over equation (2) that when using equation (1) the $T\_next$ value need not be re-calculated in a situation where a protocol data unit with a higher priority is received at the buffer memory 102 during the delaying, i.e. in a situation where the next protocol data unit changes during the delaying.

In an equipment 101 according to an embodiment of the invention functional part 105 is arranged to receive from the system 108 a piece of information 115 indicating the size PKS [bit] of the protocol data unit sent and the transmitting moment $T\_tx$ of the starting point (bit to be sent first) of the protocol data unit sent (start time of transmission). The functional part 105 is arranged to determine, based on equations $$VTS\_CIR = \max\{T\_tx - CBS\_tx/CIR\_tx, VTS\_CIRprev\} + PKS/CIR\_tx \quad (3)$$

$$VTS\_PIR = \max\{T\_tx, VTS\_PIRprev\} + PKS/PIR\_tx, \text{ and} \quad (4)$$

$$T\_next = \max\{VTS\_CIR, VTS\_PIR\} \quad (5)$$

whether the sending of the next protocol data unit should be delayed in order to meet the condition set on the transmission speed of the traffic flow. CIR_tx (Committed Information Rate) refers to the maximum permissible mean value of transmission speed [bit/s], CBS_tx (Committed Burst Size) refers to the burst size [bit] by which the maximum permissible mean value can be momentarily exceeded, PIR_tx (Peak Information Rate) refers to the highest permissible maximum value of the transmission speed [bit/s], and $T\_next$ refers to the earliest moment of time at which the next protocol data unit can be sent without violating the transmission speed limitations defined by CIR_tx, CBS_tx, and PIR_tx. VTS_CIR and VTS_PIR are auxiliary variables in which the subscript "prev" refers to the previous values of the respective auxiliary variables. The information 117 can be set e.g. as follows: information 117='1' if current time $t < T\_next$, and '0' if $t \geq T\_next$.

In an equipment 101 according to an embodiment of the invention functional part 105 is arranged to receive from the system 108 a piece of information 115 indicating the size PKS [bit] of the protocol data unit sent. The functional part 105 is arranged to
  decrease the CIR (Committed Information Rate) transmission quota by an amount corresponding to the size of the protocol data unit in response to the sending of the protocol data unit (CIR transmission quota=CIR transmission quota$_{prev}$–PKS), increase the CIR transmission quota by an amount INC_CIR_tx corresponding to the maximum permissible mean value CIR_tx of transmission speed of the traffic flow (CIR transmission quota=CIR transmission quota$_{prev}$+INC_CIR_tx), and determine whether the sending of the next protocol data unit should be delayed in order to meet the condition set on the transmission speed, by comparing a momentary value of the CIR transmission quota to a predetermined threshold value K_CIR_tx.

The principle described above is often referred to as the token bucket principle. The amount INC_CIR_tx is advantageously CIR_tx×time which has passed from the previous increase of the CIR transmission quota. The subscript "prev" refers to the value of the CIR transmission quota preceding the increase or decrease. The CIR transmission quota can be increased e.g. at equidistant intervals of time. The predetermined threshold value K_CIR_tx may be zero, for instance. If CIR transmission quota<K_CIR_tx, the sending of the next protocol data unit should be delayed in order to meet the condition set on the transmission speed of the traffic flow. The information 117 can be set e.g. as follows: information 117='1' if CIR transmission quota<K_CIR_tx, and otherwise information 117='0'. Information 117 can be updated at moments of time when the CIR transmission quota is decreased in response to the sending of the protocol data unit and at moments of time when the CIR transmission quota is increased. Advantageously a maximum permissible value CIR_max_tx is set for the CIR transmission quota, not to be exceeded by the CIR transmission quota. The difference between the maximum permissible value and the threshold value, CIR_max_tx−K_CIR_tx, represents the burst size [bit] by which the maximum permissible mean value CIR_tx of transmission speed can be temporarily exceeded.

In an equipment 101 according to an embodiment of the invention functional part 105 is arranged to receive from the system 108 a piece of information 115 indicating the size PKS [bit] of the protocol data unit sent. The functional part 105 is arranged to decrease the values for the CIR (Committed Information Rate) transmission quota and PIR (Peak Information Rate) transmission quota by an amount corresponding to the size of the transmitted protocol data unit in response to the sending of the protocol data unit (CIR transmission quota=CIR transmission quota$_{prev}$–PKS and PIR transmission quota=PIR transmission quota$_{prev}$–PKS), increase the CIR transmission quota by an amount INC_CIR_tx corresponding to the maximum permissible mean value CIR_tx of transmission speed of the traffic flow (CIR transmission quota=CIR transmission quota$_{prev}$+INC_CIR_tx), increase the PIR transmission quota by an amount INC_PIR_tx corresponding to the highest permissible maximum value PIR_tx (PIR transmission quota=PIR transmission quota$_{prev}$+INC_PIR_tx), and determine whether the sending of the next protocol data unit should be delayed in order to meet a condition set on the transmission speed, by comparing a momentary value of the CIR transmission quota to a predetermined threshold value K_CIR_tx and comparing a momentary value of the PIR transmission quota to a second predetermined threshold value K_PIR_tx.

The amount INC_CIR_tx is advantageously CIR_tx×time which has passed from the previous increase of the CIR transmission quota, and the amount INC_PIR_tx is advantageously PIR_tx×time which has passed from the previous increase of the PIR transmission quota. The subscript "prev" refers to the values of the CIR and PIR transmission quotas preceding the increase or decrease. The CIR and PIR transmission quotas can be increased e.g. at equidistant intervals of time. The predetermined threshold values K_CIR_tx and K_PIR_tx may be zeroes, for instance. If PIR transmission quota<K_PIR_tx or CIR transmission quota<K_CIR_tx, the sending of the next protocol data unit should be delayed in order to meet the condition set on the transmission speed of the traffic flow. The information 117 can be set e.g. as follows: information 117='1' if CIR transmission quota<K_CIR_tx OR PIR transmission quota<K_PIR_tx, and otherwise information 117='0'. Information 117 can be updated at moments of time when the CIR and PIR transmission quotas are decreased in response to the sending of the protocol data unit and at moments of time when the CIR and PIR transmission quotas are increased. Advantageously the PIR transmission quota is not increased over the threshold value K_PIR_tx because PIR_tx represents the highest permissible maximum value of transmission speed.

Below there are described as examples some ways of determining whether the speed of arrival of traffic representing traffic category B meets a preset condition concerning the delaying of protocol data units belonging to traffic category B and/or whether the speed of arrival meets a second preset condition concerning the discarding or marking of protocol data units belonging to traffic category B. It must be noted, however, that in an equipment 101 according to embodiments of the invention that determining can also be done in numerous ways other than those according to the examples depicted below.

In an equipment 101 according to an embodiment of the invention functional part 106 is arranged to receive a piece of information 111 indicating the size PKS of a protocol data unit belonging to traffic category B and the reception moment T_rx of the starting point of the protocol data unit (start time of reception). The functional part 106 is arranged to determine whether the speed of arrival of traffic representing traffic category B meets a preset condition based on equation $$T=T\_rx+PKS/S\_rx. \qquad(6)$$

S_rx is the maximum permissible value of the speed of arrival and T is the moment of time earlier to which the value of the speed of arrival exceeds the maximum permissible value and later to which the value of the speed of arrival remains below the maximum permissible value. Time T is valid only if the protocol data unit is the last-arrived protocol data unit belonging to traffic category B. Time T is redetermined, based on equation (6), in response to the arrival of the next protocol data unit belonging to traffic category B. Time T represents a piece of information 118 which indicates together with current time t whether the speed of arrival of traffic representing traffic category B meets a condition set on it. The information 118 can be set e.g. as follows: information 118='1' if current time t<T, and '0' if t≧T.

In an equipment 101 according to an embodiment of the invention functional part 106 is arranged to receive a piece of information 111 indicating the size PKS of a received protocol data unit belonging to traffic category B. The functional part 106 is arranged to decrease the CIR reception quota by an amount corresponding to the size of the protocol data unit in response to the reception of the protocol data unit (CIR reception quota=CIR reception quota$_{prev}$–PKS), increase the CIR reception quota by an amount INC_CIR_rx corresponding to the maximum permissible mean value CIR_rx of the speed of arrival of traffic representing traffic category B (CIR reception quota=CIR reception quota$_{prev}$+INC_CIR_rx), and determine whether the speed of arrival meets a preset condition by comparing a momentary value of the CIR reception quota to a predetermined threshold value K_CIR_rx.

The amount INC_CIR_rx is advantageously CIR_rx×time which has passed from the previous increase of the CIR reception quota. The subscript "prev" refers to the value of the CIR reception quota preceding the increase or decrease. The CIR reception quota may be increased in response to at least one of the following events, for example: reception of a protocol data unit, transmission of a protocol data unit, the current time reaching one of predetermined update moments which may occur at equidistant intervals, for example. The predetermined threshold value K_CIR_rx may be zero, for instance. If the CIR reception quota<K_CIR_rx, the speed of arrival does not meet the condition set on it. The result from the comparison between the CIR reception quota and threshold value represents the information 118 which indicates whether the speed of arrival meets the condition set on it. The information 118 can be set e.g. as follows: information 118='1' if CIR reception quota<K_CIR_rx, and otherwise information 118='0'. Information 118 can be updated at moments of time when the CIR reception quota is decreased in response to reception of a protocol data unit and at moments of time when the CIR reception quota is increased. Advantageously a maximum permissible value CIR_max_rx is set for the CIR reception quota, not to be exceeded by the CIR reception quota. The difference between the maximum permissible value and the threshold value, CIR_max_rx−K_CIR_rx, represents the burst size [bit] by which the maximum permissible mean value CIR_rx of the speed of arrival can be temporarily exceeded.

In an equipment 101 according to an embodiment of the invention functional part 106 is arranged to receive a piece of information 111 indicating the size PKS of a received protocol data unit belonging to traffic category B. The functional part 106 is arranged to decrease the CIR reception quota and PIR reception quota by an amount corresponding to the size of the protocol data unit in response to the reception of the protocol data unit (CIR reception quota=CIR reception quota$_{prev}$−PKS, and PIR reception quota=PIR reception quota$_{prev}$−PKS), increase the CIR reception quota by an amount INC_CIR_rx corresponding to the maximum permissible mean value CIR_rx of the speed of arrival of traffic representing traffic category B (CIR reception quota=CIR reception quota$_{prev}$+INC_CIR_rx), increase the PIR reception quota by an amount INC_PIR_rx corresponding to the maximum permissible value PIR_rx of the speed of arrival (PIR reception quota=PIR reception quota$_{prev}$+INC_PIR_rx), determine whether the speed of arrival meets the preset condition by comparing a momentary value of the CIR reception quota to a predetermined threshold value K_CIR_rx, and determine whether the speed of arrival meets a second preset condition by comparing a momentary value of the PIR reception quota to a second predetermined threshold value K_PIR_rx.

The amount INC_CIR_rx is advantageously CIR_rx×time which has passed from the previous increase of the CIR reception quota, and the amount INC_PIR_rx is advantageously PIR_rx×time which has passed from the previous increase of the PIR reception quota. The subscript "prev" refers to the values of the CIR and PIR reception quotas preceding the increase or decrease. The CIR and PIR reception quotas may be increased in response to at least one of the following events, for example: reception of a protocol data unit, transmission of a protocol data unit, the current time reaching one of predetermined update moments which may occur at equidistant intervals, for example. The predetermined threshold values K_CIR_rx and K_PIR_rx may be zeroes, for instance. The result from the comparison between the CIR reception quota and threshold value K_CIR_rx represents the information 118 which indicates whether the speed of arrival meets the condition set on it and whether the protocol data units belonging to traffic category B (delay-critical) will be delayed like protocol data units belonging to traffic category A (non-delay-critical). The information 118 can be set e.g. as follows: information 118='1' if CIR reception quota<K_CIR_rx, and otherwise information 118='0'. Information 118 can be updated at moments of time when the CIR and PIR reception quotas are decreased in response to reception of a protocol data unit and at moments of time when the CIR and PIR reception quotas are increased. The result from the comparison between the PIR reception quota and threshold value K_PIR_rx represents information 118 which indicates whether traffic representing traffic category B will be limited by discarding or marking protocol data units belonging to traffic category B. If a protocol data unit representing traffic category B is discarded, the decrease operations of the CIR and PIR reception quotas relating to the reception of that protocol data unit are advantageously cancelled or left undone because the discarded protocol data unit has been removed from traffic and thus is not using up the CIR or PIR reception quotas.

In an equipment 101 according to an embodiment of the invention functional part 106 is arranged to receive from the system 108 a piece of information 111 indicating the size PKS [bit] of a received protocol data unit belonging to traffic category B and the reception moment T_rx of the starting point of the protocol data unit (start time of reception). Functional part 106 is arranged to compare the reception moment T_rx to the CIR theoretical arrival time TAT_CIR, and the PIR theoretical arrival time TAT_PIR. The mean speed of arrival of traffic representing traffic category B exceeds the maximum permissible value CIR_rx, if T_rx<TAT_CIR. The speed of arrival exceeds the highest permissible maximum value PIR_rx, if T_rx<TAT_PIR. The reception time T_rx and theoretical arrival times TAT_CIR and TAT_PIR are advantageously used such that protocol data units belonging to traffic category B are delayed similarly as protocol data units belonging to traffic category A if T_rx<TAT_CIR, and protocol data unit(s) belonging to traffic category B is/are discarded or marked if T_rx<TAT_PIR. The information 118 can be set e.g. as follows: information 118='1' if T_rx<TAT_CIR, and otherwise information 118='0'. Information 116, on the basis of which protocol data units belonging to traffic category B are discarded or marked, can be set as follows, for example: information 116='1' if T_rx<TAT_PIR, and otherwise information 116='0'.

The CIR theoretical arrival time and PIR theoretical arrival time are updated according to the following equations in response to the reception of the protocol data unit:

$$TAT\_CIRnext = \max\{T\_rx - CBS\_rx/CIR\_rx, TAT\_CIR\} + PKS/CIR\_rx, \quad (7)$$

$$TAT\_PIRnext = T\_rx + PKS/PIR\_rx, \quad (8)$$

where CBS_rx (Committed Burst Size) is the burst size [bit] within the limits of which the speed of arrival can temporarily exceed the value CIR_rx. The subscript "next" refers to the updated CIR and PIR theoretical arrival times compared with the reception time of the next-to-arrive protocol data unit of traffic category B. If a protocol data unit representing traffic category B is discarded, the updates according to equations (7) and (8) relating to the reception of that protocol data unit are advantageously cancelled or left undone because the discarded protocol data unit has been removed from traffic and thus is not having an effect on the speed of arrival.

Below there are described as examples some ways of determining whether the speed of arrival of traffic representing traffic category B meets a preset condition concerning the delaying of protocol data units belonging to traffic category B. It must be noted, however, that in an equipment 101 according to embodiments of the invention that determining can also be done in numerous ways other than those according to the examples depicted below.

In an equipment 101 according to an embodiment of the invention functional part 106 is arranged to receive from the system 108 a piece of information 115 indicating the size PKS [bit] of the transmitted protocol data unit and the transmitting moment T_tx of the starting point of the protocol data unit in question (start time of transmission). The information 115 is advantageously received already during the sending of the protocol data unit. The functional part 106 is arranged to calculate the transmission speed S_B [bit/s] according to equation $$S\_B = PKS_{prev}/(T\_tx - T\_tx_{prev}) \quad (9)$$

in response to a situation in which the transmitted protocol data unit belongs to traffic category B. $PKS_{prev}$ refers to the size of the previously transmitted protocol data unit belonging to traffic category B, and $T\_tx_{prev}$ refers to the starting moment of the transmission of the previously transmitted protocol data unit. Values $PKS_{prev}$ and $T\_tx_{prev}$ have been received from the system 108 in connection with the sending of the previously transmitted protocol data unit. Transmission speed of traffic representing traffic category B meets the preset condition if S_B is equal to or smaller than the maximum permissible transmission speed S_Btx of traffic representing traffic category B. The information 118 can be set e.g. as follows: information 118='1' if S_B>S_Btx, and otherwise information 118='0'.

In an equipment 101 according to an embodiment of the invention functional part 106 is arranged to receive a piece of information 115 indicating the size PKS of a transmitted protocol data unit belonging to traffic category B. The functional part 106 is arranged to
- decrease the CIR_B transmission quota by an amount corresponding to the size of the protocol data unit in response to the sending of the protocol data unit (CIR_B transmission quota=CIR_B transmission quota$_{prev}$−PKS),
- increase the CIR_B transmission quota by an amount INC_CIR_B_tx corresponding to the maximum permissible mean value CIR_B_tx of traffic representing traffic category B (CIR_B transmission quota=CIR_B transmission quota$_{prev}$+INC_CIR_B_tx), and
- determine whether the transmission speed of traffic representing traffic category B meets a preset condition by comparing a momentary value of the CIR_B transmission quota to a predetermined threshold value K_CIR_B_tx.

The amount INC_CIR_tx is advantageously CIR_B_tx× time which has passed from the previous increase of the CIR_B transmission quota. The subscript "prev" refers to the value of the CIR_B transmission quota preceding the increase or decrease. The CIR_B transmission quota may be increased in response to at least one of the following events, for example: transmission of a protocol data unit, and the occurrence of current time reaching one of predetermined update moments which may occur at equidistant intervals, for example. The predetermined threshold value K_CIR_B_tx may be zero, for instance. If CIR_B transmission quota<K_CIR_B_tx, the transmission speed of traffic representing traffic category B does not meet the condition set on it. The result from the comparison between the CIR_B transmission quota and threshold value represents the information 118 which indicates whether the transmission speed meets the condition set on it. The information 118 can be set e.g. as follows: information 118='1' if CIR_B transmission quota<K_CIR_B_tx, and otherwise information 118='0'. Information 118 can be updated at moments of time when the CIR_B transmission quota is decreased in response to the sending of the protocol data unit and at moments of time when the CIR_B transmission quota is increased. Advantageously a maximum permissible value CIR_B_max_tx is set for the CIR_B transmission quota, and the CIR_B transmission quota shall not be increased over that value. The difference between the maximum permissible value and the threshold value, CIR_B_max_tx−K_CIR_B_tx, represents the burst size [bit] by which the maximum permissible mean value CIR_B_tx of transmission speed can be temporarily exceeded.

Figure 2A:
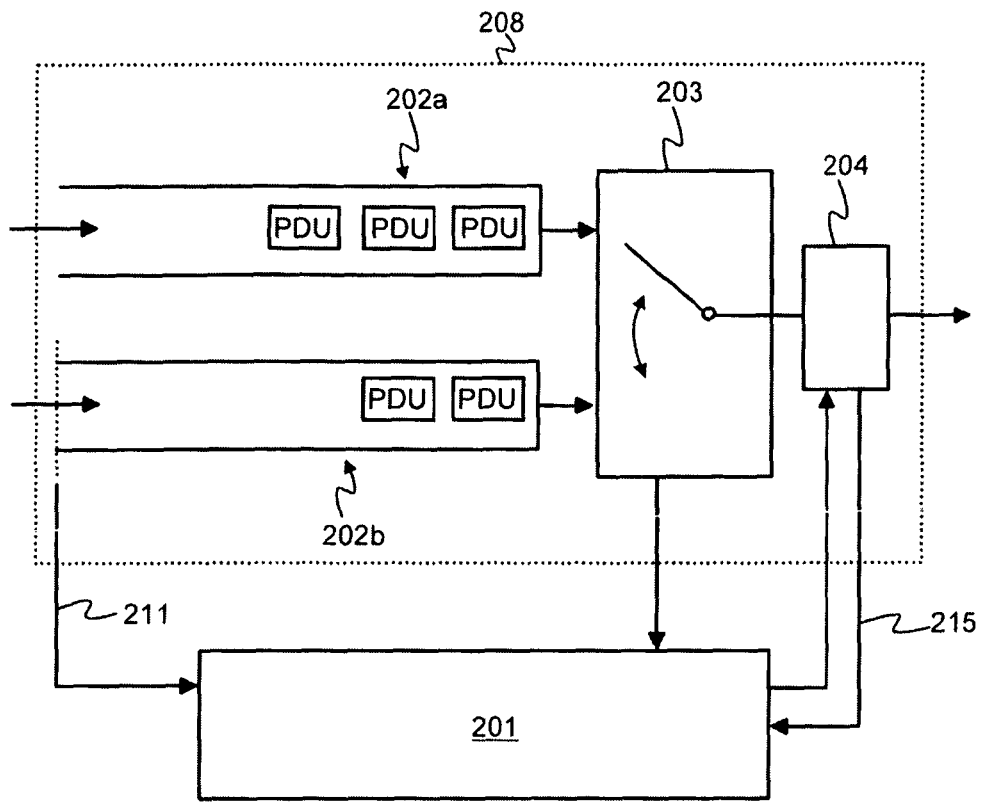
FIGS. 2a and 2b illustrate the operation of an equipment according to an embodiment of the invention in an operating environment serving as an example.
Figure 2B:
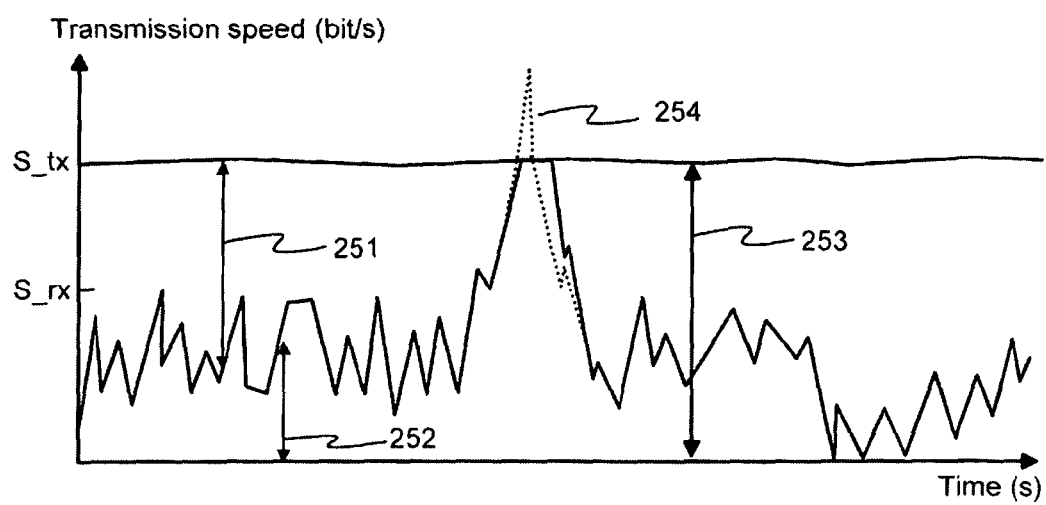

FIGS. 2a and 2b illustrate the operation of an equipment according to an embodiment of the invention in an operating environment serving as an example. The equipment 201 is connected to a system 208. The system 208 includes a FIFO (First In First Out) queue 202a for protocol data units (PDU) belonging to a non-delay-critical traffic category A, and a FIFO queue 202b for protocol data units belonging to a delay-critical traffic category B. The system includes a scheduler 203 which is arranged to choose the protocol data unit to be sent next so that protocol data units in FIFO queue 202b have a priority over protocol data units in FIFO queue 202a. In other words, the next protocol data unit is chosen from FIFO queue 202a only when FIFO queue 202b is empty. The system 208 includes a transmitter unit 204 for transmitting the chosen protocol data unit to an external device or system such as a data transfer link, for instance.

In this example case it is assumed that the equipment 201 is arranged to determine, based on equation (1), whether the sending of the next protocol data unit should be delayed in order to meet the condition set on the transmission speed of the traffic flow. Furthermore it is assumed that the equipment is arranged to determine, based on equation (6), whether the transfer speed of data traffic representative of traffic category B and constituting part of the traffic flow meets the preset condition. Thus, the transfer speed in this example case is the speed of arrival in FIFO queue 202b of traffic representing traffic category B. Information 215 indicates the size of the protocol data unit to be sent and the start time for transmission. On the basis of equation (1) it is calculated a moment of time T_next, which is the earliest moment of time at which the next protocol data unit can be sent without exceeding the maximum permissible transmission speed S_tx. Information 211 indicates the size of the protocol data unit belonging to traffic category B and the reception moment of the starting point of the protocol data unit (start time of reception). Based on equation (6) it is determined a moment of time T earlier to which the speed of arrival of traffic representing traffic category B exceeds the maximum permissible speed of arrival S_rx and later to which the speed of arrival remains below S_rx. The moment of time T obtained from equation (6) is the same or earlier than the time of arrival of the next-to-arrive protocol data unit belonging to traffic category B if the speed of arrival of traffic representing traffic category B is equal to or smaller than S_rx. Thus the sending of protocol data units belonging to traffic category B will not be delayed even if current time were earlier than T_next. In other words, transmission speed of traffic representing traffic category B is not restricted if the speed of arrival of traffic representing traffic category B is equal to or greater than S_rx.

In the situation depicted as an example in FIG. 2b it is assumed that the sum of the speed of arrival of traffic representing traffic category A and speed of arrival of traffic representing traffic category B is always equal to or greater than the maximum permissible transmission speed S_tx. Thus at least one of the FIFO queues 202a and 202b becomes congested and protocol data units will be discarded. In other words, the offered load is bigger than the maximum permissible transmission speed S_tx. In connection with the sending of each protocol data unit it is calculated a new T_next regardless of whether the protocol data unit sent belongs to traffic category A or traffic category B. Thus both the traffic that represents traffic category A and traffic that represents traffic category B will increase the quantity T_next as a function of time. The increase of T_next will limit the transmission speed of traffic representing traffic category A regardless of the speed of arrival of traffic representing traffic category A. On the other hand, the increase of T_next will limit the transmission speed of traffic representing traffic category B only if the speed of arrival of traffic representing traffic category B exceeds the limitation set on it. Thus it is achieved operation depicted in FIG. 2b, where the transmission speed 251 of traffic representing traffic category A adapts to variations in the transmission speed 252 of traffic representing traffic category B and, on the other hand, the transmission speed 253 of a traffic flow representing both traffic categories A and B can be limited. By limiting the transmission speed of traffic which represents traffic category B when the transmission speed of traffic representing traffic category B exceeds the limitation set on it, it is possible to prevent the maximum permissible transmission speed S_tx from being exceeded, as indicated by the dotted line 254. The dotted line depicts a situation in which protocol data units belonging to traffic category B would not be delayed even if the speed of arrival of traffic representing traffic category B exceeded the limitation set on it. The maximum permissible transmission speed S_tx may be temporarily exceeded e.g. in a situation where there are several protocol data units in the FIFO queue 202b and the time T produced by equation (6) indicates that the speed of arrival of traffic representing traffic category B does not exceed the maximum permissible speed of arrival S_rx. Then the protocol data units belonging to traffic category B which are in the FIFO queue 202b are transmitted successively without spacings, so the transmission speed equals the transmission capacity. Such situations, however, are rare and short in duration if the transmission capacity [bit/s] of the system 208 is appropriately specified for delay-critical traffic representing traffic category B.

Figure 3:
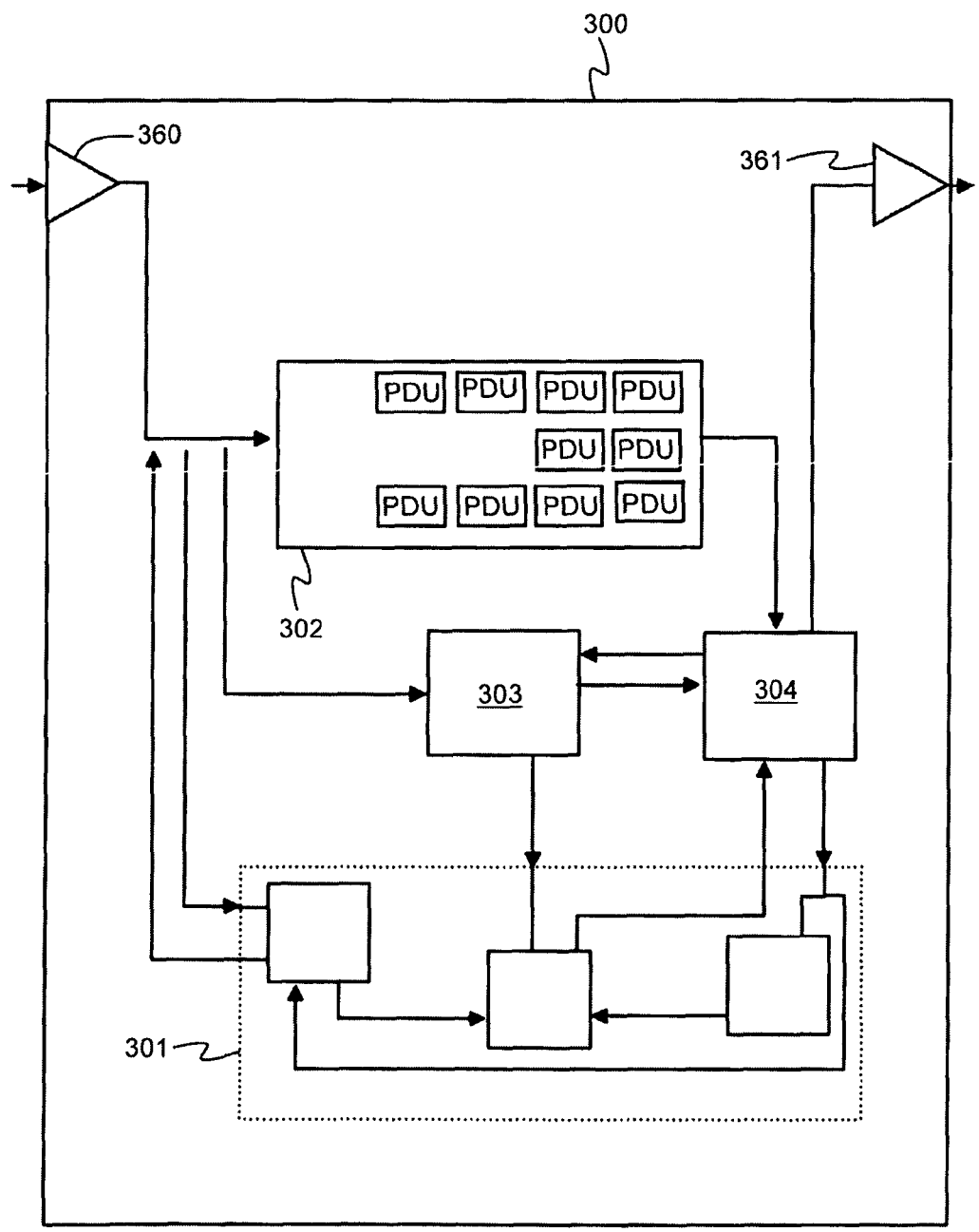
FIG. 3 shows, in a block diagram, a network element according to an embodiment of the invention.

FIG. 3 is a block diagram illustrating a network element 300 according to an embodiment of the invention, which network element may be e.g. an IP (Internet Protocol) router, Ethernet switch, ATM (Asynchronous Transfer Mode) switch, base station of a mobile communications network, MPLS (Multiprotocol Label Switching) switch, or a combination of two or more of the aforementioned. The network element includes an ingress port 360 for receiving protocol data units (PDU) e.g. from a first transfer link, and an egress port 361 for transmitting protocol data units e.g. to a second transfer link. Each protocol data unit is arranged to belong to one of at least two traffic categories which may be Classes of Service (CoS), for example. The protocol data units may be, for example, IP (Internet Protocol) packets, ATM (Asynchronous Transfer Mode) cells, Ethernet units, MPLS (Multiprotocol Label Switching) units, and/or Frame Relay units. The network element includes a buffer memory 302, scheduler 303, and a send unit 304. The buffer memory 302 is adapted to buffer protocol data units received. The scheduler 303 is adapted to choose, among protocol data units in the buffer memory 302, a protocol data unit to be sent, in accordance with a predetermined scheduling algorithm. The send unit 304 is arranged to read the chosen protocol data unit from the buffer memory 302 and to deliver the chosen protocol data unit to the egress port 361. The network element includes a control equipment 301 arranged to:

a) determine, in response to the sending of a protocol data unit, whether the sending of the next protocol data unit should be delayed in order to meet a condition set on the transmission speed of the traffic flow comprised of protocol data units, and b) delay the sending of the next protocol data unit in response to a situation in which the next protocol data unit belongs to a first traffic category A and the sending of the next protocol data unit should be delayed in order to meet a condition set on the transmission speed, c) determine whether the transfer speed of protocol data units belonging to a second traffic category and constituting part of the traffic flow meets a preset condition, d) allow the sending of the next protocol data unit in response to a situation in which the next protocol data unit belongs to the second traffic category B and the transfer speed meets the preset condition, even if the sending of the next protocol data unit should be delayed in order to meet the condition set on the transmission speed, and e) delay the sending of the next protocol data unit in response to a situation in which the next protocol data unit belongs to the second traffic category B and the sending of the next protocol data unit should be delayed in order to meet a condition set on the transmission speed and the transfer speed does not meet the preset condition.

In a network element according to an embodiment of the invention the transfer speed of protocol data units belonging to the second traffic category B is the transmission speed of traffic representing traffic category B and constituting part of the traffic flow. The control equipment 301 is arranged to determine whether the transmission speed of traffic representing traffic category B meets the preset condition.

In a network element according to an embodiment of the invention the transfer speed of protocol data units belonging to the second traffic category B is the speed of arrival of traffic representing traffic category B and constituting part of the traffic flow. The control equipment 301 is arranged to determine whether the speed of arrival meets the preset condition.

In a network element according to an embodiment of the invention the control equipment 301 is further arranged to determine whether the speed of arrival of traffic representing traffic category B meets a second preset condition and to discard one or more protocol data units belonging to traffic category B in response to a situation where the speed of arrival does not meet the second preset condition. Whether or not the preset condition concerning the delaying of protocol data units belonging to traffic category B is met can be determined based on either the transmission speed of traffic representing traffic category B or the speed of arrival of traffic representing traffic category B.

In a network element according to an embodiment of the invention the control equipment 301 is further arranged to determine whether the speed of arrival of traffic representing traffic category B meets a second preset condition and to attach a predetermined marking to one or more protocol data units belonging to traffic category B in response to a situation where the speed of arrival does not meet the second preset condition. Whether or not the preset condition concerning the delaying of protocol data units belonging to traffic category B is met can be determined based on either the transmission speed of traffic representing traffic category B or the speed of arrival of traffic representing traffic category B.

In a network element according to an embodiment of the invention the control equipment 301 is the equipment 101 shown in FIG. 1, described earlier in this document.

Figure 4A:
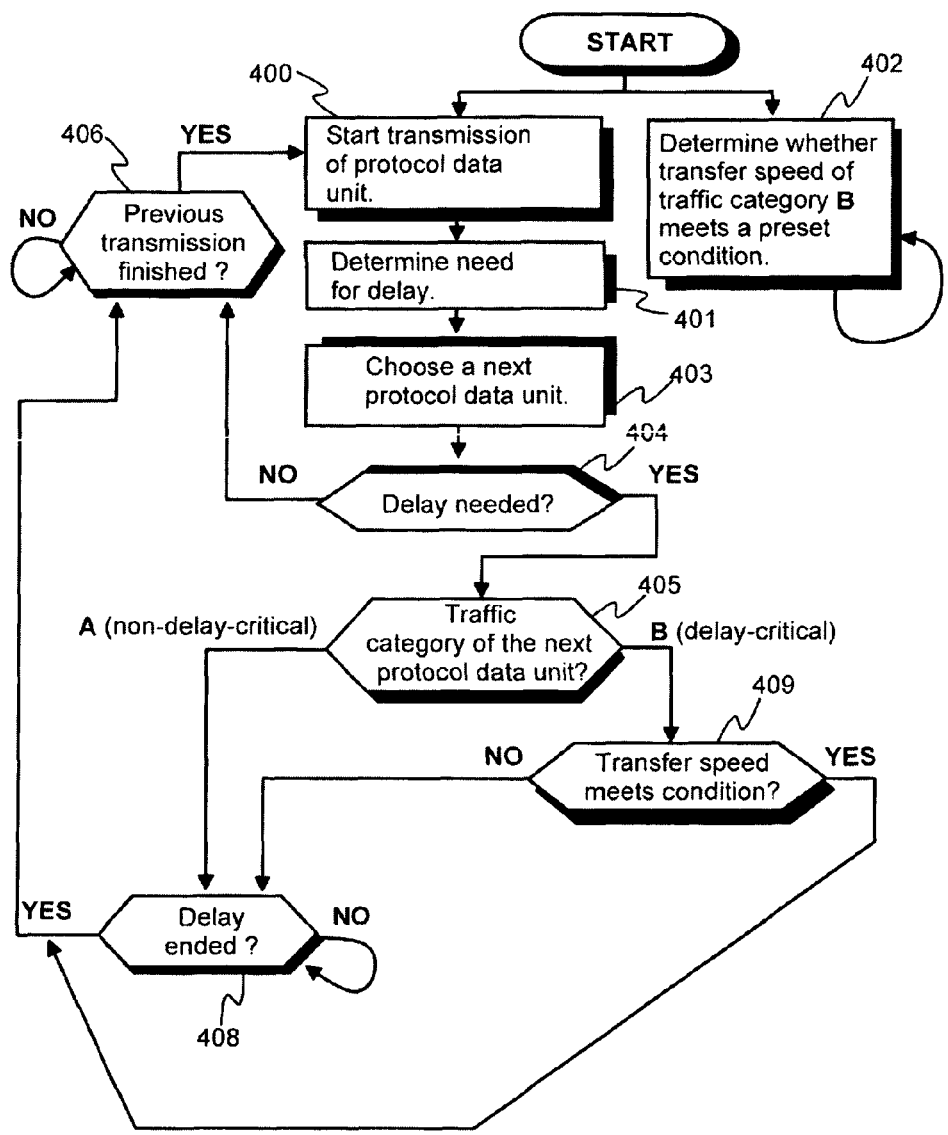
FIGS. 4a and 4b illustrate, in flow diagrams, methods according to embodiments of the invention for shaping the transmission speed of a data traffic flow.

FIG. 4a shows, in a flow diagram, a method according to an embodiment of the invention for shaping the transmission speed of a data traffic flow. Each protocol data unit in the data traffic flow is arranged to belong to one of at least two traffic categories. Below it is assumed that each protocol data unit belongs to either a non-delay-critical first traffic category A or delay-critical second traffic category B. Both of the traffic categories A and B may comprise one or more classes of service (CoS), for example. The protocol data units may be, for example, IP (Internet Protocol) packets, ATM (Asynchronous Transfer Mode) cells, Ethernet units, MPLS (Multiprotocol Label Switching) units, and/or Frame Relay units.

At 400, the sending of a protocol data unit is started. At 402, it is determined whether the transfer speed of protocol data units belonging to traffic category B and constituting part of the traffic flow meets a preset condition. In other words, at 402, it is determined whether the transfer speed of traffic representative of traffic category B and constituting part of the traffic flow meets a preset condition. At 401, it is determined, using a preset rule, in response to the sending (or start of sending) of a protocol data unit, whether the sending of the next protocol data unit should be delayed in order to meet a condition set on the transmission speed. At 403, the next protocol data unit is chosen according to a predetermined scheduling algorithm. In a situation where there is no need to delay the sending of the next protocol data unit (the NO branch of decision-making block 404) the sending of the next protocol data unit can be started when the sending of the previous protocol data unit has been completed (the YES branch of decision-making block 406). In a situation where there is a need to delay the sending of the next protocol data unit (the YES branch of decision-making block 404) the operation depends on the traffic category represented by the next protocol data unit. In a situation where the next protocol data unit belongs to the first traffic category A (the A branch of decision-making block 405) the sending of the next protocol data unit is delayed. In FIG. 4a, the delaying is depicted by decision-making block 408 after which the operation continues at decision-making block 406 when the delaying is finished. In a situation where the next protocol data unit belongs to the second traffic category B (the B branch of decision-making block 405) the operation depends on the result of the determination done at 402, i.e. whether the transfer speed of traffic representing traffic category B meets the condition set on it. In a situation where the transfer speed meets the condition set on it (the YES branch of decision-making block 409) the sending of the next protocol data unit can be started when the sending of the previous protocol data unit has been completed (the YES branch of decision-making block 406). In a situation where the transfer speed does not meet the condition set on it (the NO branch of decision-making block 409) the sending of the next protocol data unit will be delayed.

The method depicted in FIG. 4a is simplified in that the delaying, which has been started, will not be interrupted in a situation where the prerequisites for delaying cease to exist during the delaying. Such a situation may occur e.g. when during the delaying a protocol data unit arrives which according to the scheduling algorithm has a better right to become chosen than the protocol data unit which had been chosen as the next protocol data unit in the situation that prevailed at the beginning of the delaying. It is possible that the sending of a protocol data unit arrived during the delaying is allowed regardless of the need for delaying. A similar situation may also arise when the result of the determination 402 changes during the delaying to indicate that the traffic representing traffic category B meets the condition set on it.

Figure 4B:
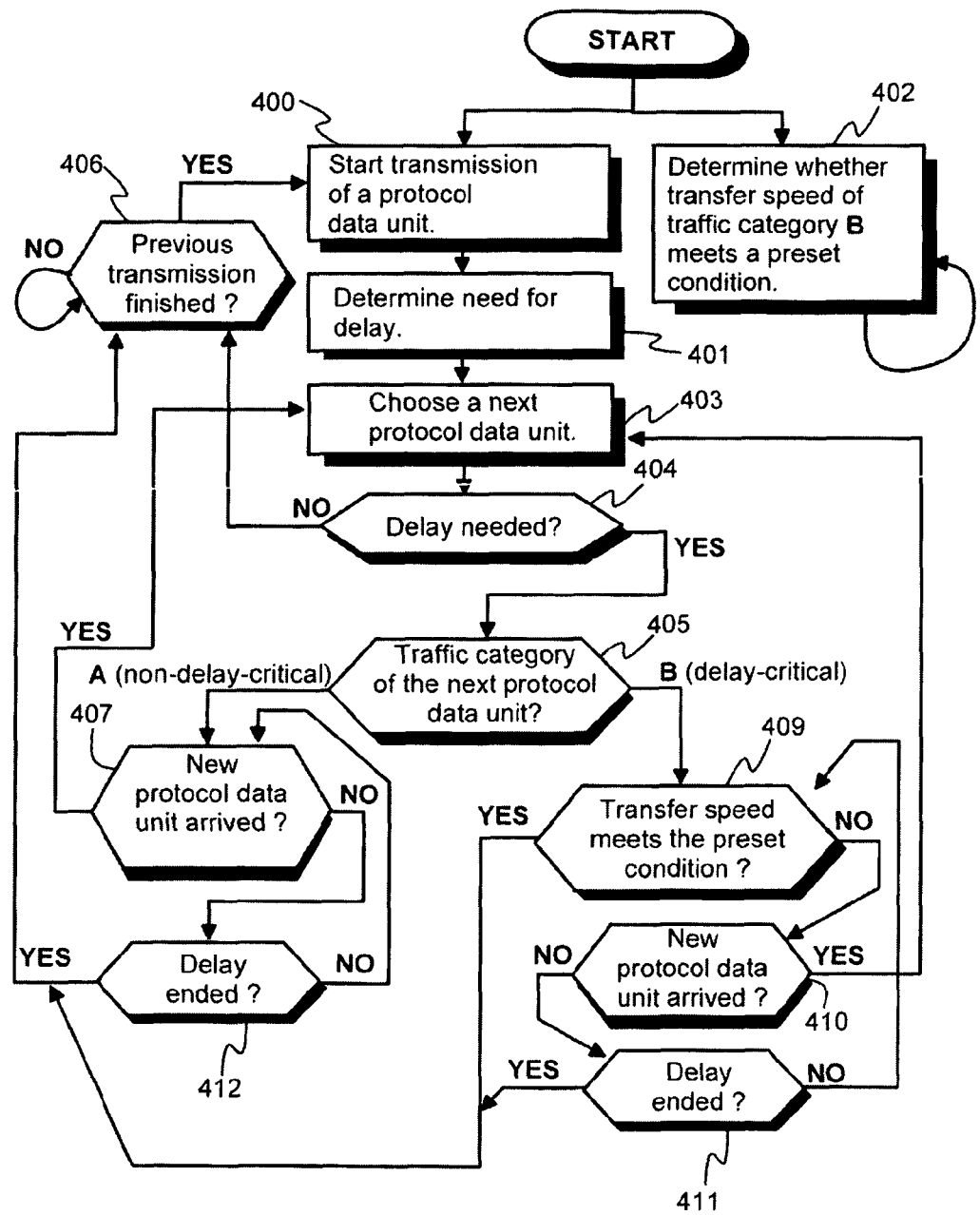

FIG. 4b shows, in a flow diagram, a method according to an embodiment of the invention where the delaying is interrupted in a situation where the prerequisites for delaying cease to exist during the delaying. In the method according to FIG. 4b the delaying of a protocol data unit belonging to traffic category A is depicted by decision-making blocks 407 and 412. In a situation where no new protocol data unit arrives during the delaying (the NO branch of decision-making block 407) the operation moves to decision-making block 412. From decision-making block 412 the operation moves back to decision-making block 407 if the delaying has not been completed. In a situation where a new protocol data unit has arrived (the YES branch of decision-making block 407) the operation moves to 403 at which a next protocol data unit is chosen according to a predetermined scheduling algorithm. The next protocol data unit may be the same as or a different one than the protocol data unit chosen before the start of delaying. From 403, the operation goes on like before the start of delaying. Delaying of the sending of a protocol data unit belonging to traffic category B is depicted by decision-making blocks 409, 410, and 411. The delaying is interrupted if the transfer speed of traffic representing traffic category B meets the condition set on it (the YES branch of decision-making block 409). In a situation where a new protocol data unit has arrived (the YES branch of decision-making block 410) the operation moves to 403 at which a next protocol data unit is chosen according to a predetermined scheduling algorithm. The next protocol data unit may be the same as or a different one than the protocol data unit chosen before the start of delaying. From 403, the operation goes on like before the start of delaying. In other respects the method illustrated in FIG. 4b corresponds to that described in FIG. 4a.

In a method according to an embodiment of the invention the transfer speed of protocol data units belonging to traffic category B is the transmission speed of traffic representing traffic category B and it is determined in the method (402) whether the transmission speed of traffic representing traffic category B meets a preset condition.

In a method according to an embodiment of the invention the transfer speed of protocol data units belonging to traffic category B is the speed of arrival of traffic representing traffic category B and it is determined in the method (402) whether the speed of arrival meets a preset condition.

In a method according to an embodiment of the invention it is determined whether the speed of arrival of traffic representing traffic category B meets a second preset condition and one or more protocol data units belonging to traffic category B are discarded in response to a situation where the speed of arrival does not meet the second preset condition. Whether or not the preset condition concerning the delaying of protocol data units belonging to traffic category B is met can be determined based on either the transmission speed of traffic representing traffic category B or the speed of arrival of traffic representing traffic category B.

In a method according to an embodiment of the invention it is determined whether the speed of arrival of traffic representing traffic category B meets a second preset condition and a predetermined marking is attached to one or more protocol data units belonging to traffic category B in response to a situation where the speed of arrival does not meet the second preset condition. Whether or not the preset condition concerning the delaying of protocol data units belonging to traffic category B is met can be determined based on either the transmission speed of traffic representing traffic category B or the speed of arrival of traffic representing traffic category B.

In a method according to an embodiment of the invention it is determined (401), based on equation $$T\_next = T\_tx + PKS/S\_tx$$

whether the sending of the next protocol data unit should be delayed in order to meet the condition set on the transmission speed. T_tx is the sending moment of the starting point of the protocol data unit transmitted, PKS is the size of the protocol data unit transmitted, S_tx is the maximum permissible transmission speed, and T_next is the earliest moment of time at which the next protocol data unit can be sent without exceeding the maximum permissible transmission speed.

In a method according to an embodiment of the invention (401):
- the CIR (Committed Information Rate) transmission quota is decreased by an amount corresponding to the size of the transmitted protocol data unit in response to the sending of the protocol data unit,
- the CIR transmission quota is increased by an amount corresponding to the maximum permissible mean value of transmission speed, and
- it is determined whether the sending of the next protocol data unit should be delayed in order to meet the condition set on the transmission speed, by comparing a momentary value of the CIR transmission quota to a predetermined threshold value.

In a method according to an embodiment of the invention (401):
- the CIR and PIR (Peak Information Rate) transmission quotas are decreased by an amount corresponding to the size of the transmitted protocol data unit in response to the sending of the protocol data unit,
- the CIR transmission quota is increased by an amount corresponding to the maximum permissible mean value of transmission speed,
- the PIR transmission quota is increased by an amount corresponding to the highest permissible maximum value of the transmission speed, and
- it is determined whether the sending of the next protocol data unit should be delayed in order to meet the condition set on the transmission speed, by comparing a momentary value of the CIR transmission quota to a predetermined threshold value and comparing a momentary value of the PIR transmission quota to a second predetermined threshold value.

In a method according to an embodiment of the invention the transfer speed of protocol data units belonging to traffic category B is the speed of arrival of traffic representing traffic category B and it is determined in the method (402) whether the speed of arrival meets a preset condition, based on equation $$T = T\_rx + PKS/S\_rx$$

where T_rx is the moment of arrival of the starting point of the last-arrived protocol data unit belonging to traffic category B, PKS is the size of the protocol data unit, S_rx is the maximum permissible value of the speed of arrival, and T is the moment of time earlier to which the value of the speed of arrival exceeds the maximum permissible value and later to which the value of the speed of arrival remains below the maximum permissible value.

In a method according to an embodiment of the invention the transfer speed of protocol data units belonging to traffic category B is the speed of arrival of traffic representing traffic category B, and in the method (402)
- the CIR reception quota is decreased by an amount corresponding to the size of a protocol data unit belonging to traffic category B in response to the reception of the protocol data unit,
- the CIR reception quota is increased by an amount corresponding to the maximum permissible mean value of the speed of arrival of traffic representing traffic category B, and
- it is determined whether the speed of arrival meets the preset condition by comparing a momentary value of the CIR reception quota to a predetermined threshold value.

In a method according to an embodiment of the invention the CIR reception quota is increased by an amount corresponding to the maximum permissible mean value of the speed of arrival in response to at least one of the following events: reception of a protocol data unit, transmission of a protocol data unit, the current time reaching one of predetermined update moments of time.

In a method according to an embodiment of the invention (402):
- the PIR reception quota is decreased by an amount corresponding to the size of a protocol data unit belonging to traffic category B in response to the reception of the protocol data unit,
- the PIR reception quota is increased by an amount corresponding to the highest permissible maximum value of the speed of arrival of traffic representing traffic category B, and
- it is determined whether the speed of arrival meets a second preset condition by comparing a momentary value of the PIR reception quota to a second predetermined threshold value.

In a method according to an embodiment of the invention the PIR reception quota is increased by an amount corresponding to the highest permissible maximum value of the speed of arrival in response to at least one of the following events: reception of a protocol data unit, transmission of a protocol data unit, the current time reaching one of predetermined update moments of time.

In a method according to an embodiment of the invention the transfer speed of protocol data units belonging to traffic category B is the transmission speed of traffic representing traffic category B, and in the method (402)
- the CIR_B transmission quota is decreased by an amount corresponding to the size of a protocol data unit belonging to traffic category B in response to the sending of the protocol data unit,
- the CIR_B transmission quota is increased by an amount corresponding to the maximum permissible mean value of the transmission speed of traffic representing traffic category B, and
- it is determined whether the transmission speed of traffic representing traffic category B meets a preset condition by comparing a momentary value of the CIR_B transmission quota to a predetermined threshold value.

In a method according to an embodiment of the invention the CIR_B transmission quota is increased by an amount corresponding to the maximum permissible mean value of the transmission speed of traffic representing traffic category B in response to at least one of the following events: sending of a protocol data unit, the current time reaching one of predetermined update moments.

A computer program according to an embodiment of the invention includes software for controlling a programmable processor so as to shape the transmission speed of a data traffic flow. Each protocol data unit in the data traffic flow is arranged to belong to one of at least two traffic categories. The software includes instructions executable by a programmable processor for making the programmable processor:
- a) determine, in response to the sending of a protocol data unit, whether the sending of the next protocol data unit should be delayed in order to meet a condition set on the transmission speed, and
- b) delay the sending of the next protocol data unit in response to a situation in which the next protocol data unit belongs to a first traffic category and the sending of the next protocol data unit should be delayed in order to meet a condition set on the transmission speed,
- c) determine whether the transfer speed of protocol data units belonging to a second traffic category and constituting part of the traffic flow meets a preset condition,
- d) allow the sending of the next protocol data unit in response to a situation in which the next protocol data unit belongs to the second traffic category and the transfer speed meets the preset condition, even if the sending of the next protocol data unit should be delayed in order to meet the condition set on the transmission speed, and
- e) delay the sending of the next protocol data unit in response to a situation in which the next protocol data unit belongs to the second traffic category and the sending of the next protocol data unit should be delayed in order to meet a condition set on the transmission speed and the transfer speed does not meet the preset condition.

The software may be e.g. subroutines or functions. For example, functional parts 105, 106, and 107 shown in FIG. 1 may be implemented by a programmable processor containing a computer program according to an embodiment of the invention or arranged to read a computer program according to an embodiment of the invention from a storage medium.

A computer program according to an embodiment of the invention is stored on a storage medium, such as an optical compact disk (CD), readable by the programmable processor.

A computer program according to an embodiment of the invention is coded into a signal which can be received via a communications network such as the Internet, for example.

As is obvious to a person skilled in the art, the invention and its embodiments are not limited to the exemplary embodiments depicted above, but the invention and its embodiments can be modified within the scope of the independent claim. Expressions used in the claims describing the existence of characteristic features are non-exclusive such that a mention of a characteristic feature shall not exclude the existence of other characteristic features not mentioned in the independent or dependent claims.

What is claimed is:

1. An equipment for shaping transmission speed of a data traffic flow in which each protocol data unit is arranged to belong to one of at least two traffic categories, the equipment comprising control equipment arranged to:
 - a) determine, in response to sending of a protocol data unit, whether sending of a next protocol data unit should be delayed in order to meet a condition set on the transmission speed of the data traffic flow,
 - b) delay the sending of the next protocol data unit in response to a situation in which the next protocol data unit belongs to a first traffic category and the sending of the next protocol data unit should be delayed in order to meet the condition set on the transmission speed of the data traffic flow,
 - c) determine whether transfer speed of protocol data units belonging to a second traffic category and constituting part of the traffic flow meets a preset condition,
 - d) allow the sending of the next protocol data unit in response to a situation in which the next protocol data unit belongs to the second traffic category and the transfer speed meets the preset condition, even if the sending of the next protocol data unit should be delayed in order to meet the condition set on the transmission speed,
 - e) delay the sending of the next protocol data unit in response to a situation in which the next protocol data unit belongs to the second traffic category and the sending of the next protocol data unit should be delayed in order to meet the condition set on the transmission speed and the transfer speed does not meet the preset condition, and
 - f) allow the sending of said next protocol data unit in response to a situation in which (i) there is no need to delay the sending of said next protocol data unit in order to meet the condition set on the transmission speed and (ii) said transfer speed does not meet the preset condition, and also in response to a situation in which (i) there is no need to delay the sending of said next protocol data unit in order to meet the condition set on the transmission speed and (ii) said transfer speed meets the preset condition.

2. An equipment according to claim 1, wherein the transfer speed is speed of arrival of traffic representing the second traffic category and constituting a part of the data traffic flow, and the control equipment is arranged to determine whether the speed of arrival meets the preset condition.

3. An equipment according to claim 1, wherein the transfer speed is transmission speed of traffic representing the second traffic category and constituting part of the data traffic flow, and the control equipment is arranged to determine whether the transmission speed of traffic representing the second traffic category meets the preset condition.

4. An equipment according to claim 1, wherein the control equipment is further arranged to determine whether speed of arrival of protocol data units which belong to the second traffic category and which constitute part of the data traffic flow meets a second preset condition, and to discard one or more protocol data units belonging to the second traffic category in response to a situation where the speed of arrival does not meet the second preset condition.

5. An equipment according to claim 1, wherein the control equipment is further arranged to determine whether speed of arrival of protocol data units which belong to the second traffic category and which constitute part of the data traffic flow meets a second preset condition, and to attach a predetermined marking to one or more protocol data units belonging to the second traffic category in response to a situation where the speed of arrival does not meet the second preset condition.

6. An equipment according to claim 1, wherein the control equipment is arranged to determine whether the sending of the next protocol data unit should be delayed in order to meet the condition set on the transmission speed, based on equation $$T\_next = T\_tx + PKS/S\_tx$$

where T_tx is a sending moment of a starting point of the protocol data unit, PKS is the size of the protocol data unit, S_tx is a maximum permissible transmission speed of the data traffic flow, and T_next is the earliest moment of time at which the next protocol data unit can be sent without exceeding the maximum permissible transmission speed.

7. An equipment according to claim 1, wherein the control equipment is arranged to:
    decrease a CIR (Committed Information Rate) transmission quota by an amount corresponding to the size of the protocol data unit in response to the sending of the protocol data unit,
    increase the CIR transmission quota by an amount corresponding to the maximum permissible mean value of the transmission speed, and
    determine whether the sending of the next protocol data unit should be delayed in order to meet the condition set on the transmission speed, by comparing a momentary value of the CIR transmission quota to a predetermined threshold value.

8. An equipment according to claim 7, wherein the control equipment is arranged to:
    decrease a PIR (Peak Information Rate) transmission quota by an amount corresponding to the size of the protocol data unit in response to the sending of the protocol data unit,
    increase the PIR transmission quota by an amount corresponding to the highest permissible maximum value of the transmission speed, and
    determine whether the sending of the next protocol data unit should be delayed in order to meet the condition set on the transmission speed, by comparing a momentary value of the PIR transmission quota to a second predetermined threshold value.

9. An equipment according to claim 2, wherein the control equipment is arranged to determine whether the speed of arrival meets the preset condition based on equation $$T = T\_rx + PKS/S\_rx$$

where T_rx is a moment of arrival of a starting point of a last-arrived protocol data unit belonging to the second traffic category, PKS is the size of the last-arrived protocol data unit, S_rx is the maximum permissible value of the speed of arrival, and T is a moment of time earlier to which the value of the speed of arrival exceeds the maximum permissible value and later to which the value of the speed of arrival remains below the maximum permissible value.

10. An equipment according to claim 2, wherein the control equipment is arranged to:
    decrease a CIR reception quota by an amount corresponding to the size of a protocol data unit belonging to the second traffic category in response to the reception of the protocol data unit,
    increase the CIR reception quota by an amount corresponding to the maximum permissible mean value of the speed of arrival, and
    determine whether the speed of arrival meets the preset condition by comparing a momentary value of the CIR reception quota to a predetermined threshold value.

11. An equipment according to claim 4, wherein the control equipment is arranged to:
    decrease a PIR reception quota by an amount corresponding to the size of a protocol data unit belonging to the second traffic category in response to the reception of the protocol data unit,
    increase the PIR reception quota by an amount corresponding to the highest permissible maximum value of the speed of arrival, and
    determine whether the speed of arrival meets the second preset condition by comparing a momentary value of the PIR reception quota to a second predetermined threshold value.

12. An equipment according to claim 10, wherein the control equipment is arranged to increase the CIR reception quota by an amount corresponding to the maximum permissible mean value of the speed of arrival in response to at least one of the following events: reception of a protocol data unit, transmission of a protocol data unit, the current time reaching one of predetermined update moments of time.

13. An equipment according to claim 11, wherein the control equipment is arranged to increase the PIR reception quota by an amount corresponding to the highest permissible maximum value of the speed of arrival in response to at least one of the following events: reception of a protocol data unit, transmission of a protocol data unit, the current time reaching one of predetermined update moments of time.

14. An equipment according to claim 3, wherein the control equipment is arranged to:
    decrease a CIR_B transmission quota by an amount corresponding to the size of a protocol data unit belonging to the second traffic category in response to the sending of the protocol data unit,
    increase the CIR_B transmission quota by an amount corresponding to the maximum permissible mean value of the transmission speed of traffic representing the second traffic category, and
    determine whether the transmission speed of traffic representing the second traffic category meets the preset condition by comparing a momentary value of the CIR_B transmission quota to a predetermined threshold value.

15. An equipment according to claim 1, wherein the protocol data units comprise one of the following alternatives: IP (Internet Protocol) packets, ATM (Asynchronous Transfer Mode) cells, Ethernet units, Frame Relay units, and MPLS (Multiprotocol Label Switching) units.

16. A network element arranged to receive, buffer and send protocol data units which constitute a data traffic flow and where each protocol data unit is arranged to belong to one of at least two traffic categories, the network element comprising control equipment arranged to:
    a) determine, in response to sending of a protocol data unit, whether sending of a next protocol data unit should be delayed in order to meet a condition set on transmission speed of the data traffic flow,
    b) delay the sending of the next protocol data unit in response to a situation in which the next protocol data unit belongs to a first traffic category and the sending of the next protocol data unit should be delayed in order to meet the condition set on the transmission speed, of the data traffic flow,
    c) determine whether transfer speed of protocol data units belonging to a second traffic category and constituting part of the traffic flow meets a preset condition,
    d) allow the sending of the next protocol data unit in response to a situation in which the next protocol data unit belongs to the second traffic category and the transfer speed meets the preset condition, even if the sending of the next protocol data unit should be delayed in order to meet the condition set on the transmission speed,
  e) delay the sending of the next protocol data unit in response to a situation in which the next protocol data unit belongs to the second traffic category and the sending of the next protocol data unit should be delayed in order to meet the condition set on the transmission speed and the transfer speed does not meet the preset condition, and
  f) allow the sending of said next protocol data unit in response to a situation in which (i) there is no need to delay the sending of said next protocol data unit in order to meet the condition set on the transmission speed and (ii) said transfer speed does not meet the present condition, and also in response to a situation in which (i) there is no need to delay the sending of said next protocol data unit in order to meet the condition set on the transmission speed and (ii) said transfer speed meets the present condition.

17. A network element according to claim 16, wherein the network element is at least one of the following: an IP (Internet Protocol) router, Ethernet switch, ATM (Asynchronous Transfer Mode) switch, base station of a mobile communications network, and an MPLS (Multi Protocol Label Switching) switch.

18. A method for shaping transmission speed of a data traffic flow in which each protocol data unit is arranged to belong to one of at least two traffic categories, the method comprising:
  a) determining, in response to sending of a protocol data unit, whether sending of a next protocol data unit should be delayed in order to meet a condition set on the transmission speed of the data traffic flow,
  b) delaying the sending of the next protocol data unit in response to a situation in which the next protocol data unit belongs to a first traffic category and the sending of the next protocol data unit should be delayed in order to meet the condition set on the transmission speed of the data traffic flow,
  c) determining whether transfer speed of protocol data units belonging to a second traffic category and constituting part of the traffic flow meets a preset condition,
  d) allowing the sending of the next protocol data unit in response to a situation in which the next protocol data unit belongs to the second traffic category and the transfer speed meets the preset condition, even if the sending of the next protocol data unit should be delayed in order to meet the condition set on the transmission speed,
  e) delaying the sending of the next protocol data unit in response to a situation in which the next protocol data unit belongs to the second traffic category and the sending of the next protocol data unit should be delayed in order to meet the condition set on the transmission speed and the transfer speed does not meet the preset condition, and
  f) allowing the sending of said next protocol data unit in response to a situation in which (i) there is no need to delay the sending of said next protocol data unit in order to meet the condition set on the transmission speed and (ii) said transfer speed does not meet the present condition, and also in response to a situation in which (i) there is no need to delay the sending of said next protocol data unit in order to meet the condition set on the transmission speed and (ii) said transfer speed meets the present condition.

19. A method according to claim 18, wherein the transfer speed is speed of arrival of traffic which represents the second traffic category and which constitutes part of the data traffic flow, and the method comprises determining whether the speed of arrival meets the preset condition.

20. A method according to claim 18, wherein the transfer speed is transmission speed of traffic which represents the second traffic category and which constitutes part of the data traffic flow, and the method comprises determining whether the transmission speed of traffic representing the second traffic category meets the preset condition.

21. A method according to claim 18, wherein the method comprises determining whether speed of arrival of protocol data units which belong to the second traffic category and which constitute part of the data traffic flow meets a second preset condition, and discarding one or more protocol data units belonging to the second traffic category in response to a situation where the speed of arrival does not meet the second preset condition.

22. A method according to claim 18, wherein the method comprises determining whether speed of arrival of protocol data units which belong to the second traffic category and which constitute part of the data traffic flow meets a second preset condition, and attaching a predetermined marking to one or more protocol data units belonging to the second traffic category in response to a situation where the speed of arrival does not meet the second preset condition.

23. A method according to claim 18, wherein the method comprises determining whether the sending of the next protocol data unit should be delayed in order to meet the condition set on the transmission speed, based on equation $$T\_next = T\_tx + PKS/S\_tx$$

where $T\_tx$ is a sending moment of a starting point of the protocol data unit, PKS is the size of the protocol data unit, $S\_tx$ is a maximum permissible transmission speed of the data traffic flow, and $T\_next$ is the earliest moment of time at which the next protocol data unit can be sent without exceeding the maximum permissible transmission speed.

24. A method according to claim 18, wherein the method comprises:
  decreasing a CIR (Committed Information Rate) transmission quota by an amount corresponding to the size of the protocol data unit in response to the sending of the protocol data unit,
  increasing the CIR transmission quota by an amount corresponding to the maximum permissible mean value of the transmission speed, and
  determining whether the sending of the next protocol data unit should be delayed in order to meet the condition set on the transmission speed, by comparing a momentary value of the CIR transmission quota to a predetermined threshold value.

25. A method according to claim 24, wherein the method comprises:
  decreasing a PIR (Peak Information Rate) transmission quota by an amount corresponding to the size of the protocol data unit in response to the sending of the protocol data unit,
  increasing the PIR transmission quota by an amount corresponding to the highest permissible maximum value of the transmission speed, and
  determining whether the sending of the next protocol data unit should be delayed in order to meet the condition set on the transmission speed, by comparing a momentary value of the PIR transmission quota to a second predetermined threshold value.

26. A method according to claim 19, wherein the method comprises determining whether the speed of arrival meets the preset condition, based on equation $$T = T\_rx + PKS/S\_rx$$

where T_rx is a moment of arrival of a starting point of a last-arrived protocol data unit belonging to the second traffic category, PKS is the size of the last-arrived protocol data unit, S_rx is a maximum permissible value of the speed of arrival, and T is the moment of time earlier to which the value of the speed of arrival exceeds the maximum permissible value and later to which the value of the speed of arrival remains below the maximum permissible value.

27. A method according to claim 19, wherein the method comprises:
   decreasing a CIR reception quota by an amount corresponding to the size of a protocol data unit belonging to the second traffic category in response to the reception of the protocol data unit,
   increasing the CIR reception quota by an amount corresponding to the maximum permissible mean value of the speed of arrival, and
   determining whether the speed of arrival meets the preset condition by comparing a momentary value of the CIR reception quota to a predetermined threshold value.

28. A method according to claim 21, wherein the method comprises:
   decreasing a PIR reception quota by an amount corresponding to the size of a protocol data unit belonging to the second traffic category in response to the reception of the protocol data unit,
   increasing the PIR reception quota by an amount corresponding to the highest permissible maximum value of the speed of arrival, and
   determining whether the speed of arrival meets the second preset condition by comparing a momentary value of the PIR reception quota to a second predetermined threshold value.

29. A method according to claim 27, wherein the CIR reception quota is increased by an amount corresponding to the maximum permissible mean value of the speed of arrival in response to at least one of the following events: reception of a protocol data unit, transmission of a protocol data unit, the current time reaching one of predetermined update moments of time.

30. A method according to claim 28, wherein the PIR reception quota is increased by an amount corresponding to the highest permissible maximum value of the speed of arrival in response to at least one of the following events: reception of a protocol data unit, transmission of a protocol data unit, the current time reaching one of predetermined update moments of time.

31. A method according to claim 20, wherein the method comprises:
   decreasing a CIR_B transmission quota by an amount corresponding to the size of a protocol data unit belonging to the second traffic category in response to the sending of the protocol data unit,
   increasing the CIR_B transmission quota by an amount corresponding to the maximum permissible mean value of the transmission speed of traffic representing the second traffic category, and
   determining whether the transmission speed of traffic representing the second traffic category meets the preset condition by comparing a momentary value of the CIR_B transmission quota to a predetermined threshold value.

32. A method according to claim 18, wherein the protocol data units comprise one of the following alternatives: IP (Internet Protocol) packets, ATM (Asynchronous Transfer Mode) cells, Ethernet units, MPLS (Multiprotocol Label Switching) units, and Frame Relay units.

33. A computer readable medium storing a computer program for controlling a programmable processor to shape transmission speed of a data traffic flow in which each protocol data unit is arranged to belong to one of at least two traffic categories, the computer program including instructions executable by the programmable processor for making the programmable processor to:
   a) determine, in response to sending of a protocol data unit, whether sending of the next protocol data unit should be delayed in order to meet a condition set on the transmission speed of the traffic flow,
   b) delay the sending of the next protocol data unit in response to a situation in which the next protocol data unit belongs to a first traffic category and the sending of the next protocol data unit should be delayed in order to meet the condition set on the transmission speed of the traffic flow,
   c) determine whether transfer speed of protocol data units belonging to a second traffic category and constituting part of the traffic flow meets a preset condition,
   d) allow the sending of the next protocol data unit in response to a situation in which the next protocol data unit belongs to the second traffic category and the transfer speed meets the preset condition, even if the sending of the next protocol data unit should be delayed in order to meet the condition set on the transmission speed,
   e) delay the sending of the next protocol data unit in response to a situation in which the next protocol data unit belongs to the second traffic category and the sending of the next protocol data unit should be delayed in order to meet the condition set on the transmission speed and the transfer speed does not meet the preset condition, and
   f) allow the sending of said next protocol data unit in response to a situation in which (i) there is no need to delay the sending of said next protocol data unit in order to meet the condition set on the transmission speed and (ii) said transfer speed does not meet the present condition, and also in response to a situation in which (i) there is no need to delay the sending of said next protocol data unit in order to meet the condition set on the transmission speed and (ii) said transfer speed meets the present condition.

* * * * *